US008850395B2

(12) United States Patent  
Mishra et al.

(10) Patent No.: US 8,850,395 B2  
(45) Date of Patent: Sep. 30, 2014

(54) MANAGING GRAPHICAL USER INTERFACE (GUI) OBJECTS IN A TESTING ENVIRONMENT

(75) Inventors: Varun Kumar Mishra, Pune (IN); Nitin Chaturvedi, Pune (IN)

(73) Assignee: International Business Machines Corporation, Armonk, NY (US)

( * ) Notice: Subject to any disclaimer, the term of this patent is extended or adjusted under 35 U.S.C. 154(b) by 1078 days.

(21) Appl. No.: 12/630,744

(22) Filed: Dec. 3, 2009

(65) Prior Publication Data

US 2011/0138357 A1 Jun. 9, 2011

(51) Int. Cl.
*G06F 9/44* (2006.01)
*G06F 11/36* (2006.01)
*G06F 3/0481* (2013.01)

(52) U.S. Cl.
CPC .......... *G06F 11/3672* (2013.01); *G06F 3/0481* (2013.01); *G06F 11/3696* (2013.01)
USPC ............ 717/124; 715/762; 715/763; 715/764

(58) Field of Classification Search
None
See application file for complete search history.

(56) References Cited

U.S. PATENT DOCUMENTS

| | | | | |
|---|---|---|---|---|
| 7,165,240 | B2 * | 1/2007 | Patterson | 717/116 |
| 7,644,368 | B2 * | 1/2010 | Pins | 715/762 |
| 7,873,908 | B1 * | 1/2011 | Varanasi et al. | 715/763 |
| 7,900,192 | B2 * | 3/2011 | Patterson | 717/125 |
| 2003/0098879 | A1 * | 5/2003 | Mathews | 345/762 |
| 2003/0236775 | A1 * | 12/2003 | Patterson | 707/3 |
| 2004/0107415 | A1 * | 6/2004 | Melamed et al. | 717/124 |
| 2004/0194054 | A1 | 9/2004 | McGrath et al. | 717/100 |
| 2004/0194065 | A1 * | 9/2004 | McGrath et al. | 717/124 |
| 2006/0156287 | A1 * | 7/2006 | Vikram | 717/124 |
| 2008/0092119 | A1 * | 4/2008 | Sweis | 717/124 |
| 2008/0133472 | A1 * | 6/2008 | Patterson | 707/3 |
| 2008/0155515 | A1 | 6/2008 | Stewart | 717/135 |
| 2009/0049427 | A1 | 2/2009 | Zhao | 717/127 |
| 2009/0217302 | A1 * | 8/2009 | Grechanik et al. | 719/320 |
| 2010/0318970 | A1 * | 12/2010 | Grechanik et al. | 717/124 |
| 2011/0016453 | A1 * | 1/2011 | Grechanik et al. | 717/125 |
| 2012/0144373 | A1 * | 6/2012 | Cook | 717/125 |

FOREIGN PATENT DOCUMENTS

WO WO 2007055611 A1 * 5/2007

OTHER PUBLICATIONS

'Hierarchical GUI Test Case Generation Using Automated Planning' by Memon et al., IEEE Transactions on Software Engineering, vol. 27, No. 2, Feb. 2001.*
'Sort' definition from Merriam-Webster from Sep. 30, 2011, archive. org of merriam-webster.com/dictionary/sort has many publish dates back to Jun. 23, 2007.*
Chen Fu et al., "Inferring Types of References to GUI Objects in Test Scripts," IEEE Computer Society, 2009, pp. 1-10.
WinRunner User's Guide, Version 7.6, 2003 Mercury Interactive, Sunnyvale, CA, pp. 1-1009.

* cited by examiner

*Primary Examiner* — Steven Snyder
(74) *Attorney, Agent, or Firm* — Prentiss Johnson; Edell, Shapiro & Finnan, LLC

(57) ABSTRACT

A method, a system and a computer program product for managing graphical user interface (GUI) objects in a testing environment. GUI objects in the testing environment are uniquely identified and the GUI objects have corresponding test objects. The uniquely identified GUI objects in the test environment are sorted in response to the pre-defined hierarchy of properties belonging to the set of properties and the pre-defined hierarchy of properties includes at least one spatial property.

13 Claims, 8 Drawing Sheets

```
SortObjectCode.java
public Object[] sortObjects(TestObject[] objArray, String alignment) {
        class HTestObjectComparator Implements Comparator <TestObject> {         300
                // @Override
                public int compare (TestObject obj1, TestObject obj2) (
                        java.awl.Rectangle r1 = (Rectangle) obj1.getProperty("screenRectangle");
                        java.awl.Rectangle r2 = (Rectangle) obj2.getProperty("screenRectangle");
                        int returnValue = 0;
                        if (r1.getMaxY() < r2.getMin Y()) {
                                returnValue=1;
                        } else if (r2.getMaxY() < r1.getMinY()) {
                                returnValue = 0;
                                if (r1.getMinX() < r2.getMinX()) {
                                        returnValue = -1;
                                } else if (r2.getMinX() < r1.getMinX()) {
                                        returnValue = 1;
                                } else {
                                returnValue=0;
                                }
                        }
                        return returnValue;
                }
        }
        class VTestObjectComparator implements Comparator <TestObject> {
                // @Override
                public int compare (TestObject obj1, TestObject obj2) {
                        java.awt.Rectangle r1 = (Rectangle) obj1.getProperty(".screenRectangle");
                        java.awt.Rectangle r2 = (Rectangle) obj2.getProperty(".screenRectangle");
                        int returnValue = 0;
                        if (r1.getMinX() < r2.getMinX()) {
                                returnValue = -1;
                        } else if (r2.getMinX() < r1.getMinX()) {
                                returnValue = 1;
                        } else { //ie eits are more or less at same
                                HTestObjectComparator h = new HTestObjectComparator();
                                returnValue = h.compare(obj1,obj2);
                        }
                        return returnValue;
```

FIG.3A

```
                                                300
                }
        }
        List<TestObject> TestObjectList = Arrays.asList(objArray);
        Comparator<TestObject> comparator = null;
        if(alignment.equalsIgnoreCase("H")) {
                comparator = new HtestObjectComparator();
        } else {
                comparator = new VTestObjectComparator();
        }
        Collections.sort(testObjectList, comparator);
        for (iterator<TestObject> iterator = testObjectList.iterator(); iterator.hasNext();) {
                TestObject to = iterator.next();
                System.out.println(to.getProperty(".screenRectangle"));
        }
        return testObjectList.toArray();
}
```

FIG.3B

MANAGING GRAPHICAL USER INTERFACE (GUI) OBJECTS IN A TESTING ENVIRONMENT

BACKGROUND OF THE INVENTION

The field of the invention generally relates to software functional testing. Software functional testing relates to the functional testing of a graphical user interface (GUI) coupled to an underlying software application. Software quality assurance (QA) is an important part in the software development lifecycle due to its contribution to ensure software quality before the software is delivered to the end users. Many QA engineers typically need to click or input on the GUI objects (sometimes also referred to as 'GUI widgets') and in some cases even text based interfaces, in the testing environment, manually and repeatedly.

In a GUI objects testing environment for functional testing, a typical workflow has two phases. The first phase is to create test objects such as test scripts (typically, in appropriate computer programming languages) by recording or development. The second phase is to playback those test objects in an end-user environment. Of the two, the first phase is relatively important, wherein the main task is to collect, manage and store information on which the GUI objects are to be tested and their related logic, which GUI object and logic will be played back, to help a runtime engine determine which and when GUI objects may need to invoke what logic, including but not limited to, clicks, double-clicks etc. To enable the management of the GUI objects, defining a set of stable identification properties correctly and uniquely is desirable.

SUMMARY OF THE INVENTION

Embodiments of the invention are directed to a method, a system and a computer program product for managing GUI objects in a testing environment. Accordingly, embodiments of the invention uniquely identify the GUI objects in the testing environment, wherein the GUI objects have corresponding test objects having at least one spatial property selected from a set of properties, and sort the uniquely identified GUI objects in the test environment in response to a pre-defined hierarchy of properties belonging to the set of properties, the pre-defined hierarchy of properties including at least one spatial property.

BRIEF DESCRIPTION OF THE DRAWINGS

Embodiments of the invention are described in detail below, by way of example only, with reference to the following schematic drawings, where:

FIGS. 3A and 3B are an exemplary Java code listing used to identify, sort and manage the GUI objects according to an example embodiment of the invention;

DETAILED DESCRIPTION OF THE INVENTION

Embodiments of the invention are directed to a method, a system and a computer program product for managing GUI objects in a testing environment.

Figure 1A:
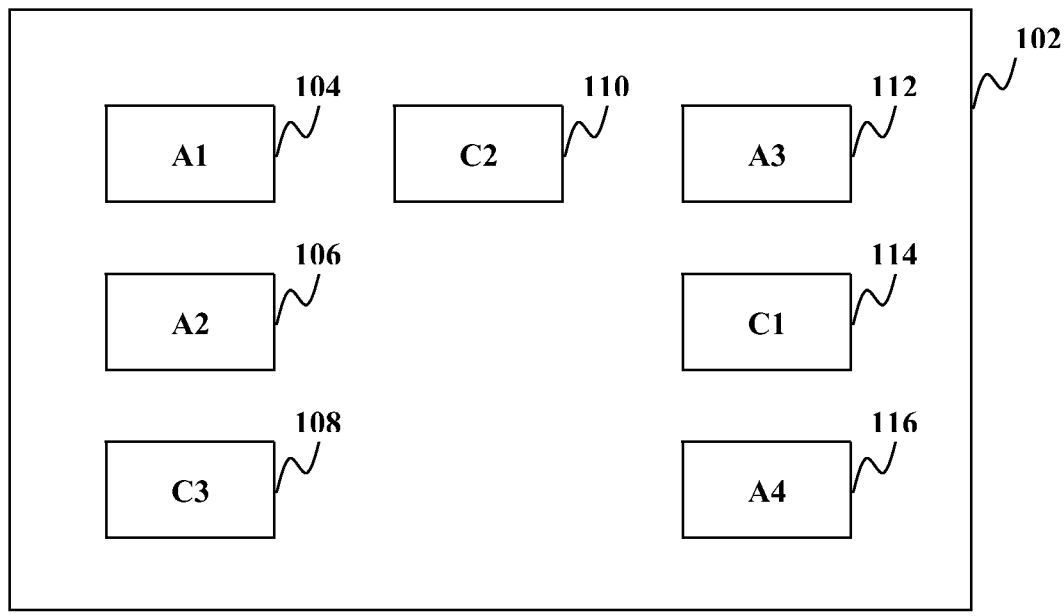
FIG. 1A shows a schematic of an exemplary display of GUI objects.

FIG. 1A shows a schematic 100 of an exemplary display 102 of GUI objects. For description, there are only two classes, viz. A and C, considered as an example. For a person ordinarily skilled in the art, it will be understood that the methodology and techniques described herein are easily extensible to more classes. In this example, for class A, there are four GUI objects: A1 104, A2 106, A3 112 and A4 116. In this example, for class C, there are three GUI objects: C1 114, C2 110, and C3 108. The placement of the four GUI objects of class A and the three GUI objects of class C, is as shown by the display 102.

Figure 1B:
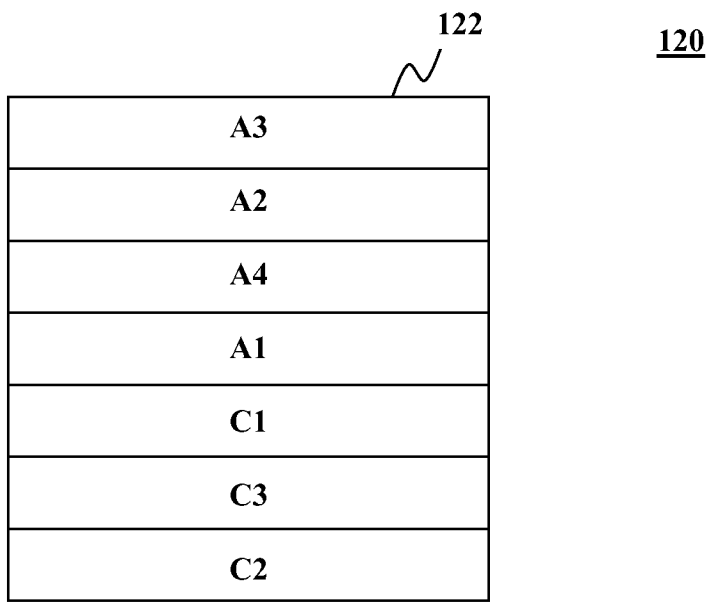
FIG. 1B shows a schematic of a list of GUI objects in a test environment in accordance with the prior art.

FIG. 1B shows a schematic 120 of a list 122 of GUI objects in a test environment in accordance with the prior art. It is apparent that the display of a sequence of the GUI objects in the list in the test environment, although is grouped according to class, appears as random. It is not mapped in an easy to understand logical manner vis-à-vis the placement of the seven GUI objects A1 through A4 and C1 through C3, as shown in the display 102 of FIG. 1A. When a QA engineer is attempting to test the GUI objects in the list in the testing environment and the display, since there is no logical mapping, trial-and-error is a commonly used method for testing various GUI objects. This may result in extraneous effort, is prone to mistakes and may result in significant wastage of testing time.

Figure 2A:
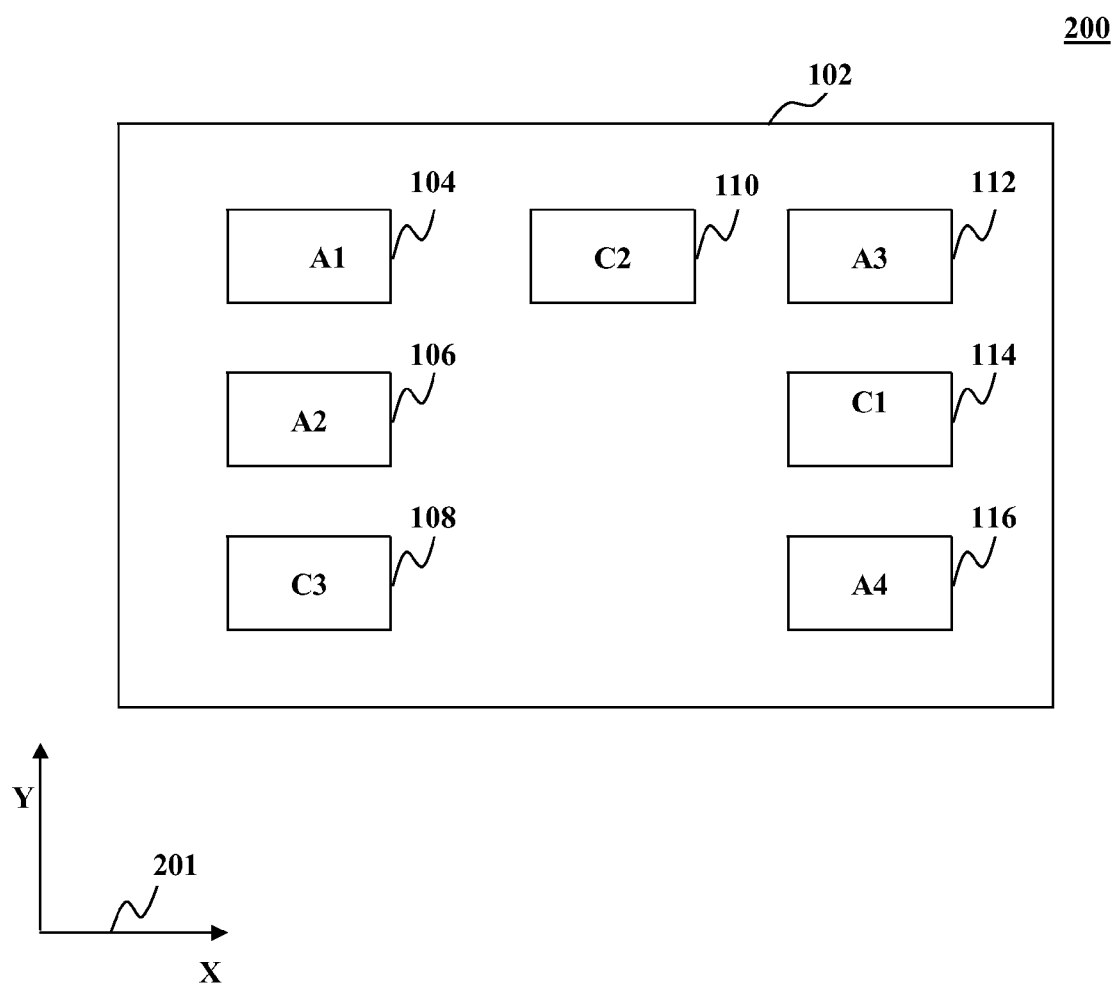
FIG. 2A shows a schematic of an exemplary display of GUI objects in accordance with an example embodiment of the invention.

FIG. 2A shows a schematic 200 of an exemplary display 102 (of FIG. 1A) of GUI objects in accordance with an example embodiment of the invention. The display of the schematic 200 is chosen to be identical to that of the display 102 of FIG. 1, in order to bring out the advantages of some of the embodiments of the invention. A reference element 201 is an exemplary reference for a Cartesian co-ordinate system used to assign spatial properties to each of the GUI objects in the plurality of GUI objects in the display 102. In an exemplary mode, the assignment of spatial property could be performed with respect to a representative point of the GUI object. An exemplary representative point could be the center of mass of the GUI object. It will be understood by a person ordinarily skilled in the art, that any other representative point for the assignment of spatial properties may be used. Examples of other representative points could be center, a specific end point, or a point defined by a user. In an exemplary manner, the display 102 is in the first quadrant of the Cartesian co-ordinate system defined by the placement of the reference element 201. It will be understood by a person ordinarily skilled in the art that the positioning of the reference element 201 can be at the top-left, top right, bottom right of the display 102. Correspondingly, depending on the orientation of the X and Y axes of the Cartesian co-ordinate system vis-à-vis the display 102, the display 102 may be in the second, third or the fourth quadrant, with respect to the reference element 201.

It will also be understood to a person ordinarily skilled in the art that a co-ordinate system is not limited to the Cartesian co-ordinate system. Any appropriate co-ordinate system including but not limited to a polar co-ordinate system can be used. If a three dimensional view of the list is desired, a 3-dimensional co-ordinate system can possibly be used, wherein the 3-dimensional co-ordinate system may include, but is not be limited to, a spherical co-ordinate system or a cylindrical co-ordinate system.

Figure 2B:
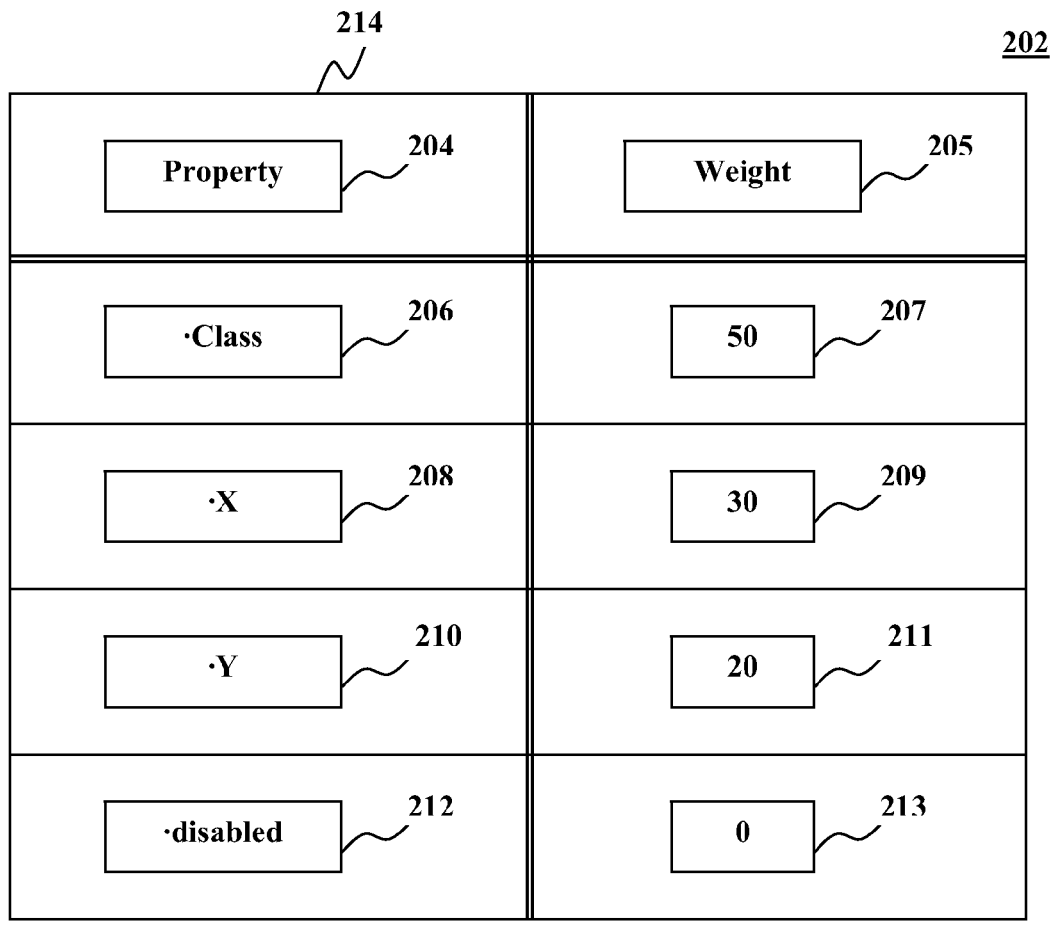
FIG. 2B shows a high-level schematic illustrating a weights setting GUI used to assign weights to various properties of the GUI objects in accordance with an example embodiment of the invention.

FIG. 2B shows a high-level schematic 202 illustrating a weights setting GUI 214 used to assign weights to various properties of the GUI objects in accordance with an example embodiment of the invention. In this example, the weights setting GUI is used. It will be understood by a person ordinarily skilled in the art that other mechanisms to assign the weight to the at least one property belonging to the set of properties, can be selected from a set of but not limited to a property input mechanism, an "ini" file input mechanism, and an application programming interface (API).

The GUI objects have corresponding test objects having at least one spatial property selected from a set of properties. The set of properties includes at least one spatial property. The set of properties, apart from at least one spatial property, may include a name property, a class property, an enabled property, a disabled property, a visible property, and a state property, and any combination thereof. It should be also noted that even though the exemplary weights setting GUI 214 includes an edit box interface, other interfaces can also be used. These methods include but are not limited to a checkbox interface, a dropdown list interface, a button interface, a tab interface, a tree interface and a radial button interface. The assigning of weights, in an exemplary mode, is performed using a cursor pointing device, which may be a mouse.

The exemplary weights setting GUI 214 include a two column table, wherein the first column is titled as property and is shown as 204. For each property listed in the first column of property 204, there is a corresponding weight assigned using the weights setting GUI 214 and those weights are listed under the second column titled weight 205.

As an example, the property ".class" is depicted as 206 and its corresponding exemplary weight 207 is assigned a value of "50". Similarly, the property ".X" is depicted by 208 and has a corresponding weight 209 with a value "30". The property ".Y" is depicted as 210 and has a corresponding weight 211 with a value of "20". The property ".disabled" is depicted as 212 and has a corresponding weight 213 with a value of "0". Only four properties, viz. ".class", ".X", ".Y", and ".disabled" are shown, however, it will be understood by a person ordinarily skilled in the art that more or less properties can possibly be included. ".X" and ".Y" are two spatial properties. It is possible to simply have only ".X" as a spatial property.

Using the assigned weights, a pre-defined hierarchy of the properties is developed. As an example, property with the highest weight is top node of the pre-defined hierarchy. Based on the values of weights of 207, 209, 211 and 213, which correspond to the weights of the properties .class 206, .X 208, .Y 210 and .disabled 212, the highest value is 50 for the .class 206 property. The next highest value of weight is for the property .X 208. Then is the property .Y 210 and the last one with zero value is .disabled 212. Thus, the pre-defined hierarchy used to sort the GUI objects is identified as [".Class"→". X"→".Y"]. For the purposes of this description, the pre-defined hierarchy [".Class"→". X"→".Y"] is termed as hierarchy1. This pre-defined hierarchy, hierarchy1, of the properties is used to sort and develop a list of GUI objects in the testing environment.

Figure 2C:
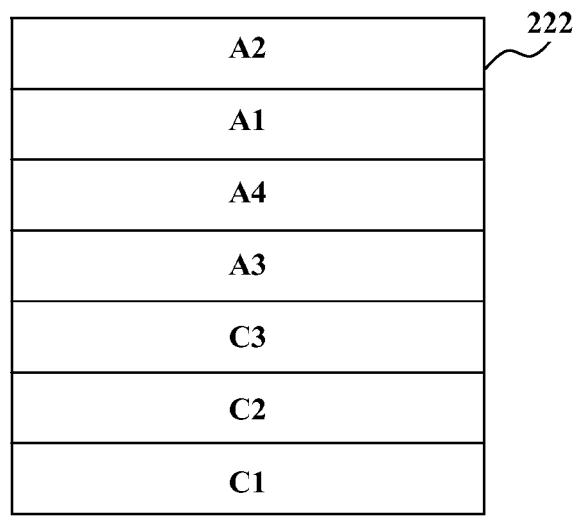
FIG. 2C shows a schematic of a list of GUI objects in a test environment corresponding to the GUI objects depicted in FIG. 2A and using the assigned weights in FIG. 2B, in accordance with an example embodiment of the invention.

FIG. 2C shows a schematic 220 of a list 222 of GUI objects in a test environment corresponding to the GUI objects depicted in FIG. 2A and using the assigned weights in FIG. 2B, in accordance with an example embodiment of the invention. Hierarchy1 depicts that the GUI objects will be grouped and sorted by class, X and Y values, and in that order. Thus in the list 222, all A GUI objects will be listed first and the C GUI objects will be listed next. Within the four A GUI objects, using the reference element 201, first a GUI object is identified that has the lowest .X value. There are two A GUI objects, viz. A1 104 and A2 106, which have the same least .X value. To decide the sequence within A1 104 and A2 106, the third property in the hierarchy1 is used. Between the two A GUI objects: A1 104 and A2 106, it is evident that A2 106 has the lower .Y value. Thus A2 106 is chosen to the first to be in the list 222 of GUI objects in the testing environment. The next A GUI object is A1 104. Evaluating the other two A GUI objects, viz. A3 112 and A4 116, the same logic of hierarchy is deployed and the third GUI object in the list of GUI objects in the testing environment is A4 116 (same .X value as that of A3 112, but lower .Y value) and then is A3 112. Having completed the list of A GUI objects, all three C GUI objects are then considered. Using hierarchy1, C3 108 has the lowest .X value, then is C2 110 and then is C1 114. Thus the sorted list of all seven GUI objects is presented in the list 222 of GUI objects in the testing environment.

Figure 2D:
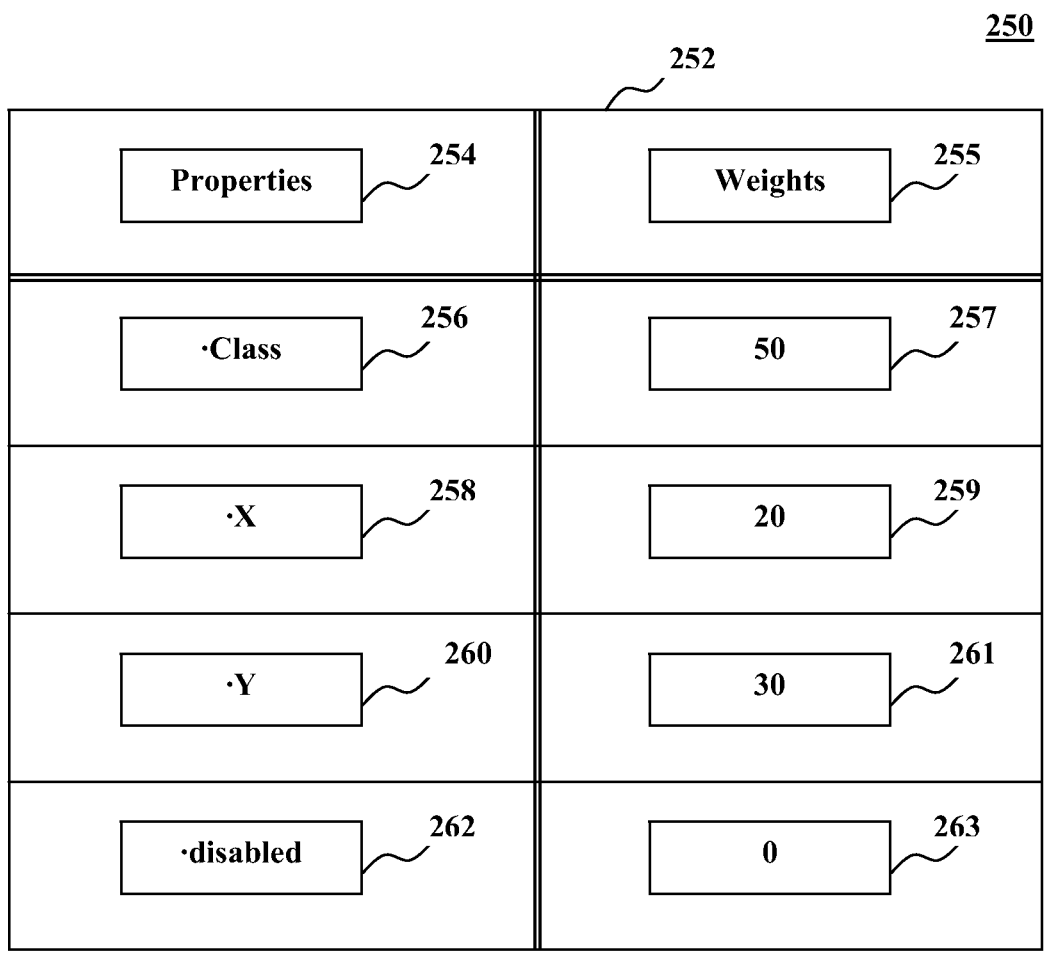
FIG. 2D shows a high-level schematic illustrating another exemplary weights setting GUI used to assign weights to various properties of the GUI objects in accordance with another example embodiment of the invention.

FIG. 2D shows a high-level schematic 250 illustrating another exemplary weights setting GUI 252 used to assign weights to various properties of the GUI objects in accordance with another example embodiment of the invention. The exemplary weights setting GUI 252 includes a two column table, wherein the first column is titled as property and is shown as 254. For each property listed in the first column of property 254, there is a corresponding weight assigned using the GUI and those weights are listed under the second column titled weight 255.

As an example, the property ".class" is depicted as 256 and its corresponding exemplary weight 257 is assigned a value of "50". Similarly, the property ".X" is depicted by 258 and has a corresponding weight 259 with a value "20". The property ".Y" is depicted as 260 and has a corresponding weight 261 with a value of "30". The property ".disabled" is depicted as 262 and has a corresponding weight 263 with a value of "0". Only four properties, viz. ".class", ".X", ".Y", and ".disabled" are shown, however, it will be understood by a person ordinarily skilled in the art that more or less properties can possibly be included. ".X" and ".Y" are two spatial properties. It is possible to simply have only ".X" as a spatial property.

Using the assigned weights, a pre-defined hierarchy of the properties is developed. As an example, property with the highest weight is top node of the pre-defined hierarchy. Based on the values of weights of 257, 259, 261 and 263, which correspond to the weights of the properties .class 256, .X 258, .Y 260 and .disabled 262, the highest value is 50 for the .class 256 property. The next highest value of weight is for the property .Y 260. Then is the property .X 258 and the last one with zero value is .disabled 262. Thus, the pre-defined hierarchy used to sort the GUI objects is identified as

[".Class"→".Y"→".X"]. For the purposes of this description, the pre-defined hierarchy [".Class"→". Y"→".X"] is termed as hierarchy2. This pre-defined hierarchy, hierarchy2, of the properties is used to sort and develop a list of GUI objects in the testing environment.

Figure 2E:
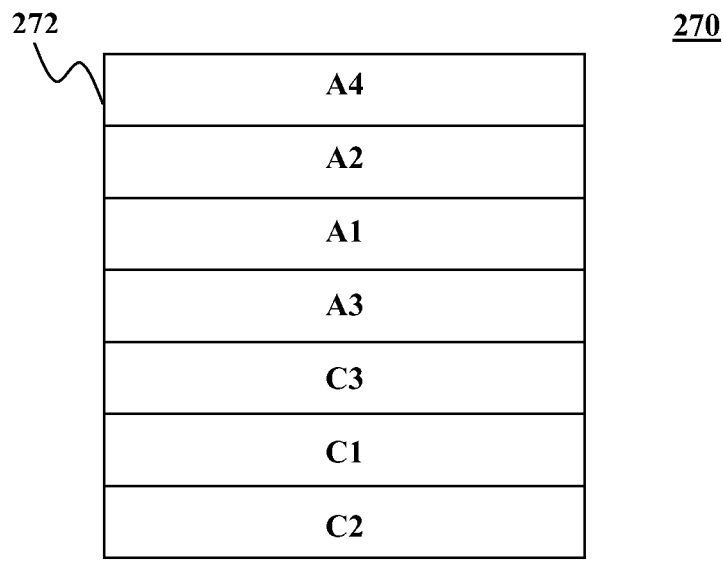
FIG. 2E shows a schematic of a list of GUI objects in a test environment corresponding to the GUI objects depicted in FIG. 2A and using the assigned weights in FIG. 2D, in accordance with another example embodiment of the invention.

FIG. 2E shows a schematic 270 of a list 272 of GUI objects in a test environment corresponding to the GUI objects depicted in FIG. 2A and using the assigned weights in FIG. 2D, in accordance with another example embodiment of the invention. Hierarchy2 depicts that the GUI objects will be grouped and sorted by class, Y and X values, and in that order. Thus in the list 272, all A GUI objects will be listed first and the C GUI objects will be listed next. Within the four A GUI objects, using the reference element 201, first a GUI object is identified that has the lowest .Y value. A4 116 has the lowest .Y value and hence it is at the top of the list 272 of GUI objects in the testing environment. The next A GUI object with next lowest .Y value is A2 106. Then, there are two A GUI objects, viz. A1 104 and A3 112, which have the same .Y value. To decide the sequence within A1 104 and A3 112, the third property in the hierarchy2 is used. Between the two A GUI objects: A1 104 and A3 112, it is evident that A1 104 has the lower .X value. Thus A1 104 is chosen to be the third in the list 272 of GUI objects in the testing environment. The next A GUI object is A3 112. Having completed the list of A GUI objects, all three C GUI objects are then considered. Using hierarchy2, C3 108 has the lowest .Y value, then is C1 114 and then is C2 110. Thus the sorted list of all seven GUI objects is presented in the list 272 of GUI objects in the testing environment.

FIGS. 3A and 3B are an exemplary Java™ (Java is a trademark of Sun Microsystems in the United States of America and other countries) code listing 300 used to identify, sort and manage the GUI objects according to an example embodiment of the invention described in FIGS. 2A-2E. It will be understood by a person ordinarily skilled in the art that Java is only an exemplary computer language that has been deployed to write the code. It is equally possible to use other languages, such as, for example, C, C++, Basic, and others.

Figure 4:
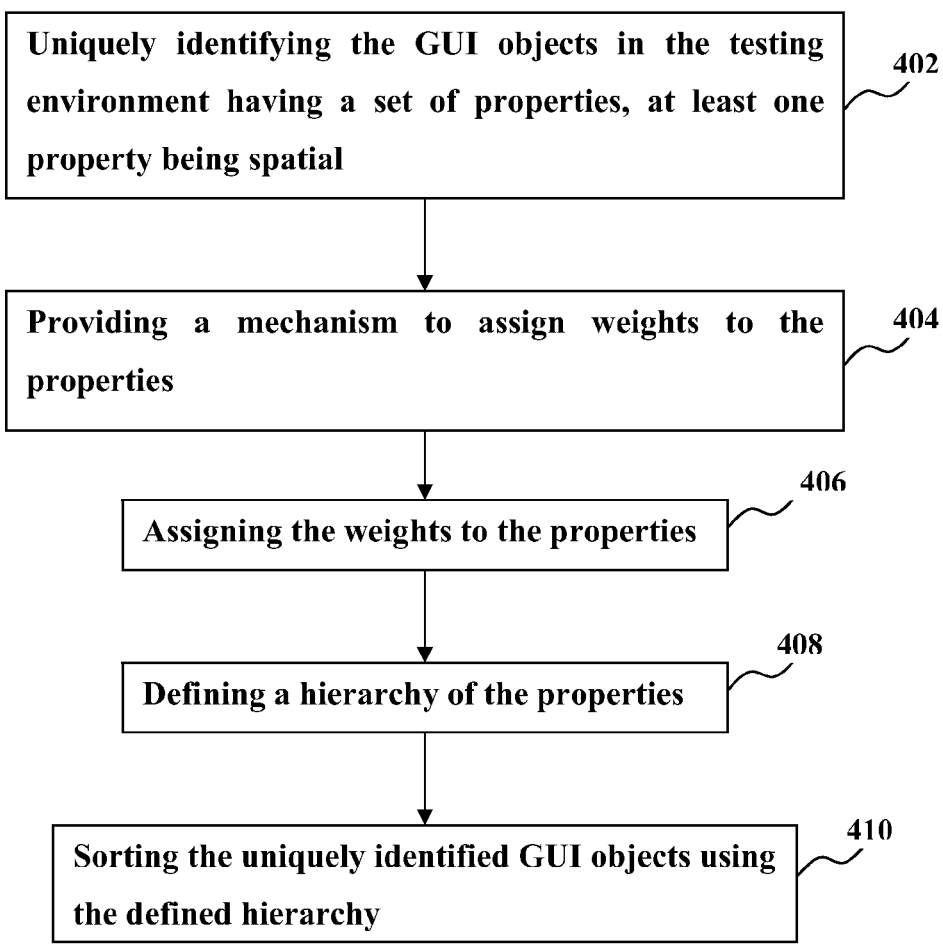
FIG. 4 shows a flow chart for managing GUI objects in a testing environment as disclosed in one embodiment of the invention.

FIG. 4 shows a flowchart of a method 400 for managing GUI objects in a testing environment as disclosed in one embodiment of the invention. The method 400 includes step 402 that depicts uniquely identifying the GUI objects in the testing environment having corresponding test objects having at least one spatial property selected from a set of properties including at least one spatial property. The method 400 further includes step 404 depicting providing a mechanism to assign a weight to the at least one property belonging to the set of properties, wherein the mechanism is one selected from a set of a graphical user interface (GUI), a property input mechanism, an "ini" file input mechanism, and an application programming interface (API). Step 406 depicts assigning weights to the properties using the selected mechanism. Step 408 depicts defining a pre-defined hierarchy of the properties belonging to the set of properties. Step 410 depicts sorting the uniquely identified GUI objects in the test environment in response to a pre-defined hierarchy of properties belonging to the set of properties, wherein at least one property selected from the pre-defined hierarchy of properties includes at least one spatial property.

Figure 5:
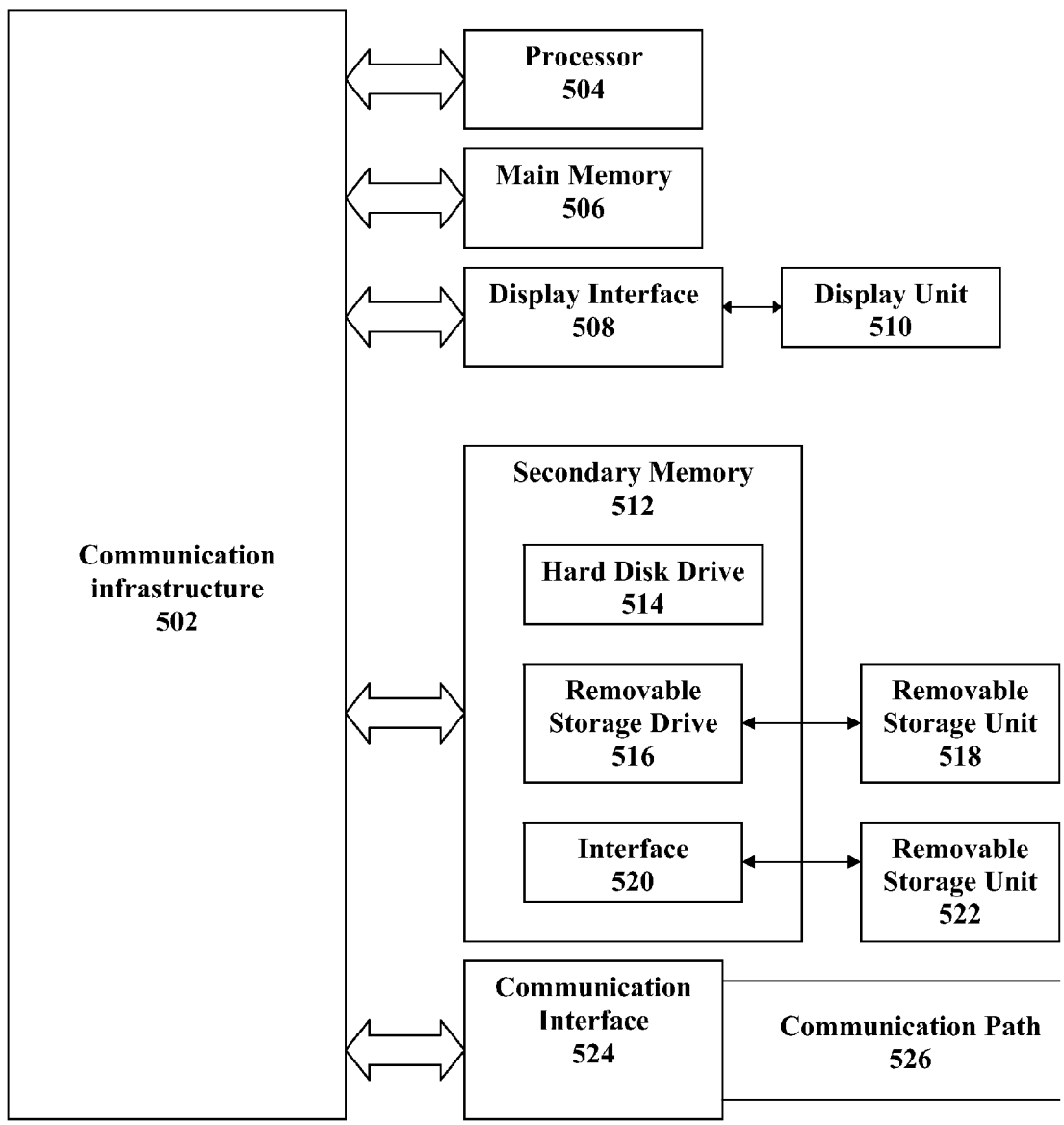
FIG. 5 shows a detailed schematic of a computer system used for managing GUI objects in a testing environment as disclosed in FIG. 4.

FIG. 5 shows a detailed schematic of a computer system used for managing GUI objects in a testing environment as disclosed in FIG. 4. FIG. 5 is a block diagram of an exemplary computer system 500 that can be used for implementing various embodiments of the present invention. In some embodiments, the computer system 500 can be used as a system executing schematics of either FIG. 2A or FIG. 2B or FIG. 2C or FIG. 2D or FIG. 2E or a combination thereof. The computer system 500 can also be used to perform the steps described in FIG. 4. The Computer system 500 includes a processor 504. It should be understood although FIG. 5 illustrates a single processor, one skilled in the art would appreciate that more than one processor can be included as needed. The processor 504 is connected to a communication infrastructure 502 (for example, a communications bus, cross-over bar, or network) where the communication infrastructure 504 is configured to facilitate communication between various elements of the exemplary computer system 500. Various software embodiments are described in terms of this exemplary computer system. After reading this description, it will become apparent to a person of ordinary skill in the relevant art(s) how to implement the invention using other computer systems and/or computer architectures.

Exemplary computer system 500 can include a display interface 508 configured to forward graphics, text, and other data from the communication infrastructure 502 (or from a frame buffer not shown) for display on a display unit 510. The computer system 500 also includes a main memory 506, which can be random access memory (RAM), and may also include a secondary memory 512. The secondary memory 512 may include, for example, a hard disk drive 514 and/or a removable storage drive 516, representing a floppy disk drive, a magnetic tape drive, an optical disk drive, etc. The removable storage drive 516 reads from and/or writes to a removable storage unit 518 in a manner well known to those having ordinary skill in the art. The removable storage unit 518, represents, for example, a floppy disk, magnetic tape, optical disk, etc. which is read by and written to by the removable storage drive 516. As will be appreciated, the removable storage unit 518 includes a computer usable storage medium having stored therein computer software and/or data.

In exemplary embodiments, the secondary memory 512 may include other similar means for allowing computer programs or other instructions to be loaded into the computer system. Such means may include, for example, a removable storage unit 522 and an interface 520. Examples of such may include a program cartridge and cartridge interface (such as that found in video game devices), a removable memory chip (such as an EPROM, or PROM) and associated socket, and other removable storage units 522 and interfaces 520 which allow software and data to be transferred from the removable storage unit 522 to the computer system 500.

The computer system 500 may also include a communications interface 524. The communications interface 524 allows software and data to be transferred between the computer system and external devices. Examples of the communications interface 524 may include a modem, a network interface (such as an Ethernet card), a communications port, a PCM-CIA slot and card, etc. Software and data transferred via the communications interface 524 are in the form of signals which may be, for example, electronic, electromagnetic, optical, or other signals capable of being received by communications interface 524. These signals are provided to the communications interface 524 via a communications path (that is, channel) 526. The channel 526 carries signals and may be implemented using wire or cable, fiber optics, a phone line, a cellular phone link, an RF link, and/or other communications channels.

In this description, the terms "computer program medium," "computer usable medium," and "computer readable medium" are used to generally refer to media such as the main memory 506 and the secondary memory 512, the removable storage drive 516, a hard disk installed in the hard disk drive 514, and signals. These computer program products are means for providing software to the computer system. The computer readable medium allows the computer system to read data, instructions, messages or message packets, and other computer readable information from the computer readable medium. The computer readable medium, for example, may include non-volatile memory, such as Floppy, ROM, Flash memory, Disk drive memory, CD-ROM, and other permanent storage. It can be used, for example, to transport information, such as data and computer instructions, between computer systems. Furthermore, the computer readable medium may comprise computer readable information in a transitory state medium such as a network link and/or a network interface, including a wired network or a wireless network, that allows a computer to read such computer readable information.

Computer programs (also referred to herein as computer control logic) are stored in the main memory 506 and/or the secondary memory 512. Computer programs may also be received via the communications interface 524. Such computer programs, when executed, can enable the computer system to perform the features of exemplary embodiments of the present invention as discussed herein. In particular, the computer programs, when executed, enable the processor 504 to perform the features of the computer system 500. Accordingly, such computer programs represent controllers of the computer system.

Embodiments of the invention further provide a computer program product for managing graphical user interface (GUI) objects in a testing environment, the computer program product including a computer readable storage medium having a computer readable program code embodied therewith. Advantages of various embodiments of the invention include an easy to understand mapping being readily available for a software QA engineer for testing of software. Advantages of various embodiments of the invention also include potential reduction in required software testing time.

The described techniques may be implemented as a method, apparatus or article of manufacture involving software, firmware, micro-code, hardware such as logic, memory and/or any combination thereof. The term "article of manufacture" as used herein refers to code or logic and memory implemented in a medium, where such medium may include hardware logic and memory [e.g., an integrated circuit chip, Programmable Gate Array (PGA), Application Specific Integrated Circuit (ASIC), etc.] or a computer readable medium, such as magnetic storage medium (e.g., hard disk drives, floppy disks, tape, etc.), optical storage (CD-ROMs, optical disks, etc.), volatile and non-volatile memory devices [e.g., Electrically Erasable Programmable Read Only Memory (EEPROM), Read Only Memory (ROM), Programmable Read Only Memory (PROM), Random Access Memory (RAM), Dynamic Random Access Memory (DRAM), Static Random Access Memory (SRAM), flash, firmware, programmable logic, etc.]. Code in the computer readable medium is accessed and executed by a processor. The medium in which the code or logic is encoded may also include transmission signals propagating through space or a transmission media, such as an optical fiber, copper wire, etc. The transmission signal in which the code or logic is encoded may further include a wireless signal, satellite transmission, radio waves, infrared signals, Bluetooth, the internet etc. The transmission signal in which the code or logic is encoded is capable of being transmitted by a transmitting station and received by a receiving station, where the code or logic encoded in the transmission signal may be decoded and stored in hardware or a computer readable medium at the receiving and transmitting stations or devices. Additionally, the "article of manufacture" may include a combination of hardware and software components in which the code is embodied, processed, and executed. Of course, those skilled in the art will recognize that many modifications may be made without departing from the scope of embodiments, and that the article of manufacture may include any information bearing medium. For example, the article of manufacture includes a storage medium having stored therein instructions that when executed by a machine results in operations being performed.

Certain embodiments can take the form of an entirely hardware embodiment, an entirely software embodiment or an embodiment containing both hardware and software elements. In an exemplary embodiment, the invention is implemented in software, which includes but is not limited to firmware, resident software, microcode, etc.

Elements that are in communication with each other need not be in continuous communication with each other, unless expressly specified otherwise. In addition, elements that are in communication with each other may communicate directly or indirectly through one or more intermediaries. Additionally, a description of an embodiment with several components in communication with each other does not imply that all such components are required. On the contrary a variety of optional components are described to illustrate the wide variety of possible embodiments.

Further, although process steps, method steps or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously, in parallel, or concurrently. Further, some or all steps may be performed in run-time mode.

The terms "certain embodiments", "an embodiment", "embodiment", "embodiments", "the embodiment", "the embodiments", "one or more embodiments", "some embodiments", and "one embodiment" mean one or more (but not all) embodiments unless expressly specified otherwise. The terms "including", "comprising", "having" and variations thereof mean "including but not limited to", unless expressly specified otherwise. The enumerated listing of items does not imply that any or all of the items are mutually exclusive, unless expressly specified otherwise. The terms "a", "an" and "the" mean "one or more", unless expressly specified otherwise.

Computer program means or computer program in the present context mean any expression, in any language, code or notation, of a set of instructions intended to cause a system having an information processing capability to perform a particular function either directly or after either or both of the following a) conversion to another language, code or notation; b) reproduction in a different material form.

Although exemplary embodiments of the present invention have been described in detail, it should be understood that various changes, substitutions and alternations could be made thereto without departing from spirit and scope of the inventions as defined by the appended claims. Variations described for exemplary embodiments of the present invention can be realized in any combination desirable for each particular application. Thus particular limitations, and/or embodiment enhancements described herein, which may have particular advantages to a particular application, need not be used for all applications. Also, not all limitations need be implemented in methods, systems, and/or apparatuses including one or more concepts described with relation to exemplary embodiments of the present invention.

What is claimed is:

1. A computer program product for managing graphical user interface (GUI) objects in a testing environment, the computer program product comprising:
a non-transitory computer readable storage medium having computer readable program code embodied therewith, the computer readable program code configured to:
uniquely identify the GUI objects of a GUI in the testing environment, the GUI objects having corresponding test objects and at least one spatial property selected from a set of properties;
map the uniquely identified GUI objects in the test environment to a display of the GUI objects by arranging the uniquely identified GUI objects in an order within the test environment corresponding to locations of objects within the displayed GUI, wherein the arranging the uniquely identified GUI objects comprises:
sorting the uniquely identified GUI objects of the GUI in the test environment into a first set of one or more groups based on a first property in a pre-defined hierarchical order of two or more properties belonging to the set of properties, wherein the two or more properties are each associated with a corresponding weight and arranged in the pre-defined hierarchical order based on those corresponding weights to define the mapping for the uniquely identified GUI objects; and
sorting the GUI objects in each of the first set of one or more groups into one or more sub-groups based on a second property subordinate to the first property in the pre-defined hierarchical order, wherein at least one property selected from the pre-defined hierarchical order of two or more properties includes at least one spatial property and the first and second properties are selected based on corresponding weights.

2. The computer program product of claim 1, wherein the at least one spatial property is expressed using a co-ordinate system.

3. The computer program product of claim 1, wherein at least one property selected from the pre-defined hierarchical order of two or more properties includes at least one source-code property.

4. The computer program product of claim 1, wherein the set of properties further comprises a name property, a class property, an enabled property, a disabled property, a visible property, a state property, and any combination thereof.

5. The computer program product of claim 1, wherein the computer readable program code is further configured to:
define the pre-defined hierarchical order of the properties belonging to the set of properties.

6. The computer program product of claim 5, wherein the computer readable program code is further configured to:
assign the weights to the two or more properties belonging to the set of properties, wherein the weights determine a rank in the pre-determined hierarchical order of properties.

7. The computer program product of claim 6, wherein the computer readable program code is further configured to:
provide a mechanism to assign the weights to each property belonging to the set of properties, wherein the mechanism is one selected from a set comprising a graphical user interface (GUI), a property input mechanism, an "ini" file input mechanism, and an application programming interface (API).

8. The computer program product of claim 7, wherein the GUI of the mechanism is one selected from a set comprising a checkbox interface, a dropdown list interface, a button interface, an edit box interface, a tab interface, a tree interface and a radial button interface.

9. A system for managing graphical user interface (GUI) objects in a testing environment, the system comprising at least one processor and at least one memory, wherein the processor is adapted to:
uniquely identify the GUI objects of a GUI in the testing environment, the GUI objects having corresponding test objects and at least one spatial property selected from a set of properties;
map the uniquely identified GUI objects in the test environment to a display of the GUI objects by arranging the uniquely identified GUI objects in an order within the test environment corresponding to locations of objects within the displayed GUI, wherein the arranging the uniquely identified GUI objects comprises:
sorting the uniquely identified GUI objects of the GUI in the test environment into a first set of one or more groups based on a first property in a pre-defined hierarchical order of two or more properties belonging to the set of properties, wherein the two or more properties are each associated with a corresponding weight and arranged in the pre-defined hierarchical order based on those corresponding weights to define the mapping for the uniquely identified GUI objects; and
sorting the GUI objects in each of the first set of one or more groups into one or more sub-groups based on a second property subordinate to the first property in the pre-defined hierarchical order, wherein at least one property selected from the pre-defined hierarchical order of two or more properties includes at least one spatial property and the first and second properties are selected based on corresponding weights.

10. The system of claim 9, wherein the processor is further adapted to:
define the pre-defined hierarchical order of the properties belonging to the set of properties;
assign the weights to the two or more properties belonging to the set of properties, wherein the weights determine a rank in the pre-determined hierarchical order of properties; and
provide a mechanism to assign the weights to each property belonging to the set of properties, wherein the mechanism is one selected from a set comprising a graphical user interface (GUI), a property input mechanism, an "ini" file input mechanism, and an application programming interface (API).

11. The system of claim 9, wherein the at least one spatial property is expressed using a co-ordinate system selected from a set comprising a Cartesian co-ordinate system and a polar co-ordinate system, and wherein the set of properties further comprises a name property, a class property, an enabled property, a disabled property, a visible property, a state property, and any combination thereof.

12. The computer program product of claim 1, wherein the computer readable program code is further configured to:
determine that a first node corresponding to a highest priority of the pre-defined hierarchical order of properties comprises a class;

group the uniquely identified GUI objects by class to form the first set of one or more groups;

determine that a second node corresponding to a second priority of the pre-defined hierarchical order of properties comprises a first directional axis;

determine that a third node corresponding to a third priority of the pre-defined hierarchical order of properties comprises a second directional axis;

group each of the first set of one or more groups into one or more sub-groups, wherein each sub-group contains one or more uniquely identified GUI objects with a substantially similar position along the first directional axis;

sort each sub-group by first directional axis position; and sort the uniquely identified GUI objects within each sub-group by second directional axis position.

13. The system of claim 9, wherein the processor is further adapted to:

determine that a first node corresponding to a highest priority of the pre-defined hierarchical order of properties comprises a class;

group the uniquely identified GUI objects by class to form the first set of one or more groups;

determine that a second node corresponding to a second priority of the pre-defined hierarchical order of properties comprises a first directional axis;

determine that a third node corresponding to a third priority of the pre-defined hierarchical order of properties comprises a second directional axis;

group each of the first set of one or more groups into one or more sub-groups, wherein each sub-group contains one or more uniquely identified GUI objects with a substantially similar position along the first directional axis;

sort each sub-group by first directional axis position; and sort the uniquely identified GUI objects within each sub-group by second directional axis position.

* * * * *